United States Patent
Himayat et al.

(10) Patent No.: US 9,706,469 B2
(45) Date of Patent: Jul. 11, 2017

(54) RADIO RESOURCE CONTROL (RRC) PROTOCOL FOR CELL SELECTION AND TRAFFIC STEERING FOR INTEGRATED WLAN/3GPP RADIO ACCESS TECHNOLOGIES

(71) Applicant: Intel Corporation, Santa Clara, CA (US)

(72) Inventors: Nageen Himayat, Fremont, CA (US); Alexander Sirotkin, Petach Tikva (IL); Jing Zhu, Portland, OR (US); Alexandre Stojanovski, Paris (FR); Mo-han Fong, Sunnyvale, CA (US); Pingping Zong, Randolph, NJ (US); Vivek G. Gupta, San Jose, CA (US); Huaning Niu, Milpitas, CA (US); Konstantinos Dimou, Santa Clara, CA (US); Shu-Ping Yeh, New Taipei (TW); Shilpa Talwar, Los Altos, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 14/583,223

(22) Filed: Dec. 26, 2014

(65) Prior Publication Data
US 2015/0350953 A1 Dec. 3, 2015

Related U.S. Application Data

(60) Provisional application No. 62/007,389, filed on Jun. 3, 2014.

(51) Int. Cl.
*H04W 28/08* (2009.01)
*H04W 40/02* (2009.01)
*H04W 84/12* (2009.01)

(52) U.S. Cl.
CPC .......... *H04W 40/02* (2013.01); *H04W 28/08* (2013.01); *H04W 84/12* (2013.01)

(58) Field of Classification Search
CPC ...... H04W 40/02; H04W 28/08; H04W 84/12
See application file for complete search history.

(56) References Cited

U.S. PATENT DOCUMENTS

| 8,364,148 | B2 * | 1/2013 | Dravida | ............ H04W 60/00 455/41.2 |
| 2006/0068777 | A1 | 3/2006 | Sadowsky et al. | |

(Continued)

FOREIGN PATENT DOCUMENTS

| WO | WO 2012-061734 A3 | 5/2012 |
| WO | WO 2012-121757 A1 | 9/2012 |

OTHER PUBLICATIONS

3rd Generation Partnership Project, Technical Specification Group Services and System Aspects, Study on S2a Mobility based on GPRS Tunnelling Protocol (GTP) and Wireless Local Area Network (WLAN) access to the Enhanced Packet Core (EPC) network (SaMOG), Stage 2 (Release 12); Sep. 2013; 3GPP TR 23.852.

(Continued)

*Primary Examiner* — Curtis A Alia
(74) *Attorney, Agent, or Firm* — Ledell Ansari, LLP (57) ABSTRACT

An integrated WLAN/WWAN Radio Access Technology (RAT) architecture is described in which signaling used to control the integration of the WLAN/WWAN architecture is performed over the Radio Resource Control (RRC) plane. The integrated architecture may allow for User Equipment (UE) assistance in cell selection and traffic steering. In particular, UE-assisted RRC signaling is described for managing inter-RAT session transfers and secondary cell (SCell) selection.

25 Claims, 8 Drawing Sheets

(56) References Cited

U.S. PATENT DOCUMENTS

2013/0083783 A1    4/2013  Gupta et al.
2014/0050086 A1    2/2014  Himayat et al.
2015/0099501 A1*  4/2015  Kim .................. H04W 52/0216
                                                                            455/418

OTHER PUBLICATIONS

3rd Generation Partnership Project, Technical Specification Group Radio Access Network, Study on Wireless Local Area Network (WLAN)—3GPP radio interworking (Release 12); Dec. 2013; 3GPP TR 37.834.
International Search Report and Written Opinion received in corresponding PCT Application PCT/US2015/028968 dated Aug. 27, 2015.

\* cited by examiner

RADIO RESOURCE CONTROL (RRC) PROTOCOL FOR CELL SELECTION AND TRAFFIC STEERING FOR INTEGRATED WLAN/3GPP RADIO ACCESS TECHNOLOGIES

RELATED APPLICATIONS

The present application claims the benefit of U.S. Provisional Patent Application No. 62/007,389, which was filed on Jun. 3, 2014, the contents of which is hereby incorporated by reference as though fully set forth herein.

BACKGROUND

Growth in data traffic driven by smart phone devices, tablets, etc. can strain the capacity of wireless networks. One approach, used by the wireless industry, to address the growth in data traffic has been network densification, wherein small cells are used to increase reuse of licensed spectrum, which continues to be scarce and expensive. Additionally, network operators have also increasingly utilized unlicensed spectrum (e.g., WiFi spectrum) to cope with the increasing capacity demand.

One industry trend facilitating greater cooperation across licensed and unlicensed radio networks is the adoption and deployment of integrated multi-radio small cells with co-located unlicensed (e.g., WiFi) and licensed radio spectrum interfaces. Integrated cells allow for leveraging common infrastructure and site locations, reducing the operational and capital expenditures of network operators. As networks move towards smaller cell sizes, the footprints of cellular and WiFi coverage may increasingly overlap, making such deployments feasible.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As used herein, a "wireless local area network (WLAN)" may refer to a wireless computer network that links two or more devices using a wireless distribution method that includes relatively short ranges. A WLAN may be used to create wireless networks within a limited area such as a home or office building. One example of a radio technology that may be used to implement a WLAN is WiFi (i.e., using Institute of Electrical and Electronics Engineers (IEEE) 802.11-based standards). WLANs are typically implemented using unlicensed radio spectrum (i.e., radio frequencies that can be used without a license from a controlling government entity). In contrast to WLANs, Wireless Wide Area Networks (WWANs), as used herein, may refer to networks that provide wireless access over larger areas. One example of a WWAN is a cellular network implemented using licensed radio spectrum. From the user's perspective, the WWAN coverage may be provided seamlessly over a number of cells, in the cellular network, to potentially create a large area of uninterrupted network coverage. One example of a WWAN is a cellular radio network based on 3rd Generation Partnership Project (3GPP) Long Term Evolution (LTE) standards.

An integrated WLAN/WWAN Radio Access Technology (RAT) architecture is described herein. The integrated architecture may include a network controlled framework for WLAN/WWAN integration, wherein the integrated architecture may allow for User Equipment (UE) assistance in cell selection and traffic steering. In particular, UE-assisted Radio Resource Control (RRC) signaling is described for managing inter-RAT session transfers and secondary cell (SCell) selection.

Allowing the UE to assist in cell and RAT selection decisions may be beneficial as the UE may have good visibility with respect to the UE platform and Quality of Experience (QoE) requirements of applications implemented at the UE platform. However, the network may be better able match the needs of a number of UEs. In one implementation, the UE may indicate preferences to the network but may not autonomously make the cell selection or traffic steering decisions. It may be up to the network to confirm final cell selection and traffic steering decisions.

As described herein, the WLAN (e.g., WiFi) RAT may be operated as a secondary carrier ("SCell") for data offload under LTE control, and the LTE RAT may serve as the primary carrier ("PCell"). A mobile device may be in connected mode on the LTE link regardless of whether traffic is routed across the WLAN or the LTE link. The WLAN carrier may be coupled above the MAC layer.

In one implementation described herein, UE may include a first component to connect to a Wireless Wide Area Network (WWAN) using licensed frequency spectrum; a second component to connect to a Wireless Local Area Network (WLAN) using unlicensed frequency spectrum; and processing circuitry. The processing circuitry to: receive, from the WWAN, assistance information including policies that relate to selection of secondary communication cells that are formed over the WLAN; select a particular secondary communication cell based on the assistance information and based on information specific to the UE; transmit an indication of the selected particular secondary communication cell, the indication being transmitted via radio resource control (RRC) layer signaling, to an evolved NodeB (eNB) associated with the WWAN; receive acknowledgement, from the eNB, of the selected particular secondary communication cell; and route traffic over the secondary communication cell based on the reception of the acknowledgement.

In some implementations, the UE may transmit the indication of the selected particular secondary cell is performed via a RRC Connection Reconfiguration Complete message or a UE Assistance Information message. Additionally, the acknowledgement of the selected particular secondary communication cell may be received, from the eNB, as a Media Access Control (MAC) Control Element. Additionally, the processing circuitry may be further to: receive, as information elements associated with a RRC Connection Reconfiguration message, identification of a potential secondary communication cell and security keys associated with the potential secondary communication cell.

In some implementations, the processing circuitry may be further to: receive, from the WWAN, additional assistance information including policies that relate to traffic steering between the WWAN and the WLAN; and indicate, via RRC signaling with the eNB, a traffic steering preference to the eNB. Additionally, the processing circuitry may be to receive, via RRC signaling from the eNB, a decision relating to the traffic steering, and wherein routing the traffic additionally includes routing the traffic to steer the traffic between the secondary communication cell and a primary communication cell, associated with the WWAN, based on the decision relating to the traffic steering.

In another possible implementation, an integrated access point may include a WLAN access point; and an eNB that provides an air interface for a WWAN. The eNB may be coupled to the WLAN access point via a low latency interface and the eNB including processing circuitry to: Identify one or more secondary cells, associated with the WLAN access point, to which UE can connect to offload data from the WWAN to the WLAN; transmit an indication, via radio resource control (RRC) layer signaling, of the one or more secondary cells, to the UE; receive a selection, from the UE, of one or the one or more secondary cells; and transmit, to the UE and based on the selection received from the UE, an indication to activate the one of the one or more secondary cells.

In some implementations, the integrated access point may be further to: transmit assistance information to the UE, the assistance information including policies that relate to selection of the one or more secondary cells. Additionally, the indication of the one or more secondary cells may be included as information associated with a RRC Connection Reconfiguration Complete message. Additionally, the selection of the one or more secondary cells may be received via RRC layer signaling.

In another possible implementation, UE may comprise a first component to connect to a WWAN; a second component to connect to a WLAN; and processing circuitry to: receive, from a network device associated with the WWAN, assistance information including policies that relate to traffic steering between the WWAN and the WLAN; determine, based on the assistance information and based on an environment of the UE, a preference relating to traffic steering between the WWAN and the WLAN; transmit, via radio resource control (RRC) layer signaling and to the network device, an indication of the determined preference; receive, via RRC layer signaling from the network device, instructions for performing traffic steering; and steer traffic between the WWAN and the WLAN based on the received instructions.

In another implementation, an integrated access point may include a WLAN access point; and an eNB that provides an air interface for a WWAN, the eNB being coupled to the WLAN access point via a low latency interface. The eNB including processing circuitry to: provide, to UE associated with the eNB, policies that relate to traffic steering between the WWAN and the WLAN; receive, from the UE, a traffic steering preference made by the UE; and determine, based on the received traffic steering preference from the UE, a traffic steering decision; and transmit, to the UE, the determined traffic steering decision.

In another implementation, a method may include receiving, by a UE, and over a primary cell associated with a base station, assistance information including policies that relate to selection of secondary cells that are formed over a WLAN; select, by the UE, a particular communication cell based on the assistance information and based on information specific to the UE; transmit, by the UE, an indication of the selected particular secondary cell, the indication being transmitted via radio resource control (RRC) layer signaling, to the base station; receive, by the UE, acknowledgement, from the base station, of the selected particular secondary cell; and route, by the UE, traffic over the secondary cell based on the reception of the acknowledgement.

In another possible implementation, a UE may include means for receiving, over a primary cell associated with a base station, assistance information including policies that relate to selection of secondary cells that are formed over a WLAN; means for selecting a particular secondary cell based on the assistance information and based on information specific to the UE; means for transmitting an indication of the selected particular secondary cell, the indication being transmitted via radio resource control (RRC) layer signaling, to the base station; means for receiving acknowledgement, from the base station, of the selected particular secondary cell; and means for changing a WLAN association, corresponding to the selected particular secondary cell, based on using IEEE 802.11r-based signaling or based on RRC layer signaling.

Figure 1:
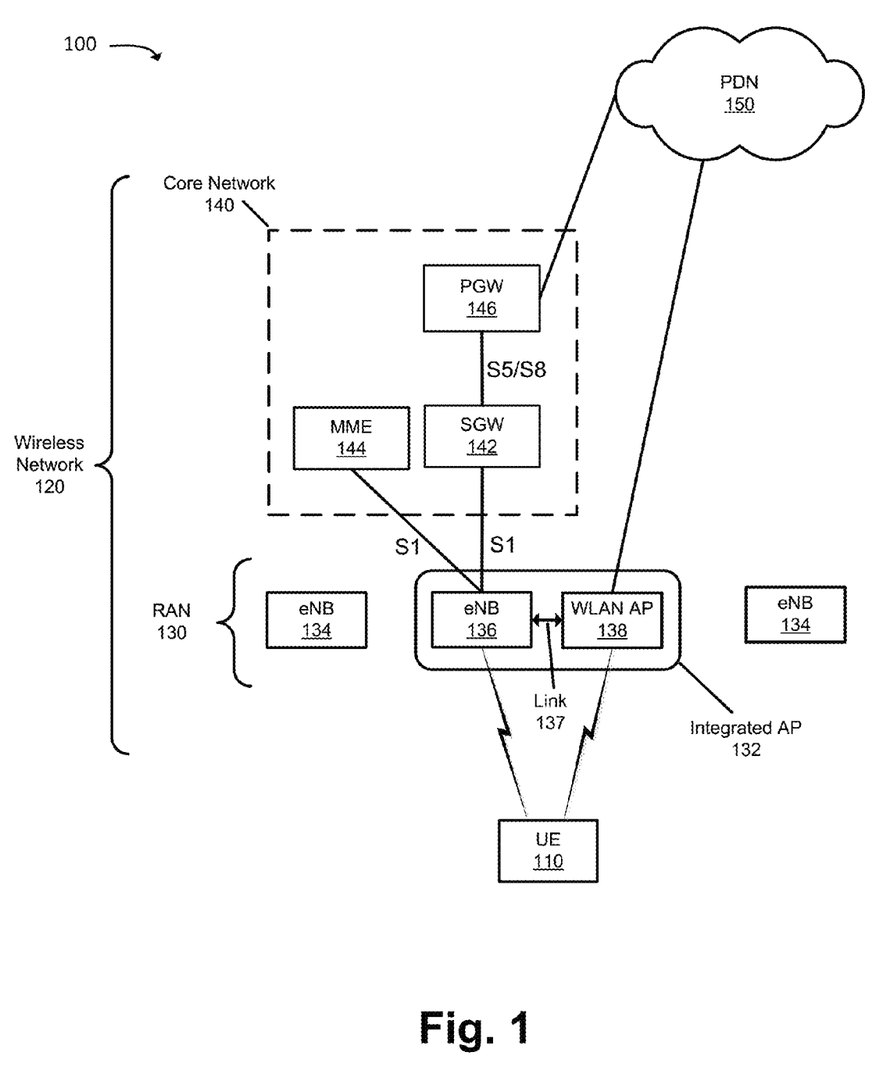
FIG. 1 is a diagram of an example environment in which systems and/or methods described herein may be implemented.

FIG. 1 is a diagram of an example environment 100 in which systems and/or methods described herein may be implemented. As illustrated, environment 100 may include user equipment (UE) 110, which may obtain network connectivity from wireless network 120. Although a single UE 110 is shown for simplicity in FIG. 1, in practice, multiple UEs 110 may operate in the context of a wireless network. Wireless network 120 may provide access to one or more external networks, such as packet data network (PDN) 150. The wireless network may include radio access network (RAN) 130 and core network 140. Some or all of RAN 130 may be associated with a network operator that controls or otherwise manages core network 140. Core network 140 may include an Internet Protocol (IP)-based network, such as a System Architecture Evolution (SAE) core network or a General Packet Radio Service (GPRS) core network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as evolved NodeBs (eNBs), and are illustrated as eNBs 134 and 136. Some of the eNBs, such as eNB 136, may be associated with an integrated access point (AP), such as integrated AP 132. Integrated AP 132, in addition to providing functionality associated with a traditional eNB, may also include one or more WLAN (e.g., WiFi) access points (WLAN AP) 138. Integrated AP 132 may provide RAN based coordination and simultaneous use of the radio resources between different RATs (e.g., 3GPP cellular (WWAN) and WiFi (WLAN)).

In some implementations, integrated AP 132 may be implemented such that eNB 136 and AP 138 may be physically co-located as part of an integrated multi-radio small cell. Alternatively or additionally, integrated AP 132 may be implemented such that eNB 136 and AP 138 are physically separated but logically co-located, such as via an external, low-latency standardized or proprietary interface that may be used to connect eNB 136 with AP 138. In either case, link 137, which may include a proprietary or other type of low-latency interface, may be implemented between eNB 136 and AP 138. The coverage ranges of eNB 136 and AP 138 may be different and may or may not overlap.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146. Although certain network devices are illustrated in environment 100 as being part of RAN 130 and core network 140, whether a network device is labeled as being in the "RAN" or the "core network" of environment 100 may be an arbitrary decision that may not affect the operation of wireless network 120.

SGW 142 may include one or more network devices that aggregate traffic received from one or more eNBs 134/136. SGW 142 may generally handle user (data) plane traffic. MME 144 may include one or more computation and communication devices that perform operations to register UE 110 with core network 140, establish bearer channels associated with a session with UE 110, hand off UE 110 from one eNodeB to another, and/or perform other operations. MME 144 may generally handle control plane traffic. SGW 142 may include one or more network devices that aggregate traffic received from one or more eNodeBs 134/136. SGW 142 may generally handle user (data) plane traffic.

PGW 146 may include one or more devices that act as the point of interconnect between core network 140 and external IP networks, such as PDN 150, and/or operator IP services. PGW 146 may route packets to and from the access networks and the external IP networks.

PDN 150 may each include packet-based networks. PDN 150 may include external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

A number of communication interfaces, between various devices, are labeled in FIG. 1. The labeled communication interfaces may represent various protocols that are used to communicate between the various devices illustrated in FIG. 1. For example, eNBs 134 and 136 may communicate with SGW 142 using the 3GPP standardized S1 interface, and SGW 142 may communicate with PGW 146 using the 3GPP standardized S5/S8 interface.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100.

Figure 2:
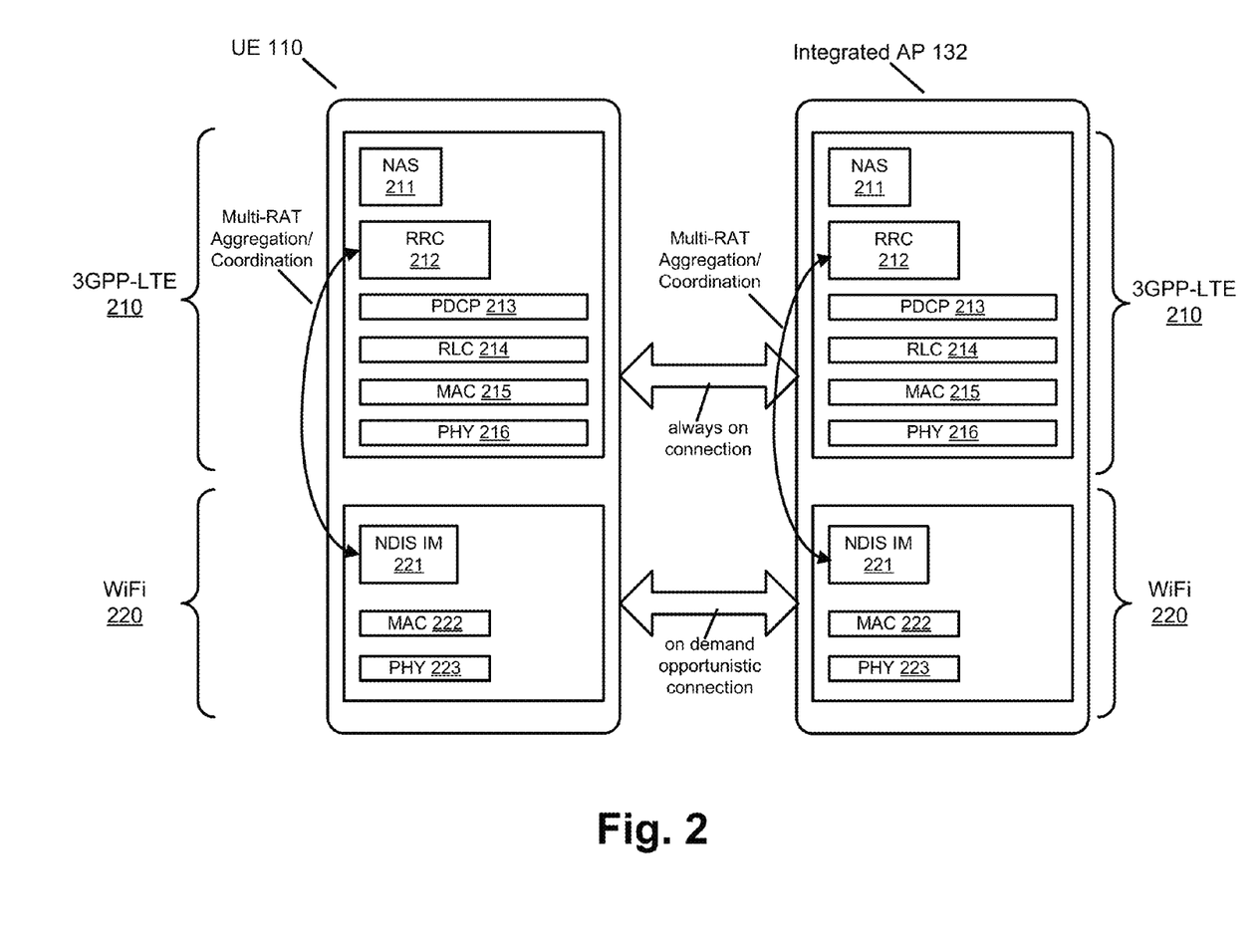
FIG. 2 is a diagram conceptually illustrating an example of various protocol layers, and the interaction of the protocol layers.

FIG. 2 is a diagram conceptually illustrating an example of various protocol layers, and the interaction of the protocol layers, in UE 110 and integrated AP 132. As previously discussed, UE 110 and integrated AP 132 may be devices that include multiple RATs (i.e., multi-mode radio devices), such as devices that include WWAN and WLAN RATs. In the implementations described below, UE 110 and integrated AP 132 will be particularly described as including 3GPP-LTE and WiFi RATs. In other implementations, other possible RATs could be used.

As illustrated in FIG. 2, UE 110 may include 3GPP-LTE component 210 and WiFi component 220. The protocol stack for 3GPP-LTE component 210 of UE 110 may include: Non-Access Stratum (NAS) layer 211, Radio Resource Control (RRC) layer 212, Packet Data Convergence Protocol (PDCP) layer 213, radio link control (RLC) layer 214, media access control (MAC) layer 215, and physical (PHY) layer 216. The protocol stack for WiFi component 220 of UE 110 may include: Network Driver Interface Specification (NDIS) intermedia (IM) layer 221, MAC layer 222, and PHY layer 223. The 3GPP-LTE RAT and WiFi RAT of integrated AP 132 may include protocol layers that correspond to the protocol layers of UE 110.

Referring to 3GPP-LTE component 210, NAS layer 211 may represent the highest stratum of the control plane at the radio interface. An example of the functions performed by NAS layer 211 may include mobility support for UE 110 and support of session management procedures to establish and maintain IP connectivity between UE 110 and PGW 146. RRC layer 212 may perform control functions relating to the LTE air interface control plane. An example of the functions performed by RRC layer 212 may include: broadcasting of system information related to the NAS, broadcasting of system information related to the access stratum (AS), paging, security functions, mobility functions, and Quality of Service (QoS) functions.

PDCP layer 213 may perform functions including, for example, header compression and decompression of IP data, transfer of data (user plane or control plane), maintenance of PDCP sequence numbers (SNs), and/or one or more other functions related to the PDCP layer. RLC layer 214 may perform functions, relating to the LTE air interface control and user planes, such as transfer of upper layer packet data units, error correction, and in-sequence delivery of upper layer packet data units. MAC layer 215 may provide an interface to the network physical layer and may provide services such as channel access control services. PHY layer 216 may implement the basic networking hardware transmission technologies for 3GGP-LTE component 210.

Referring to WiFi component 220, NDIS IM layer 221 may represent an application programming interface (API) for network interface devices. NDIS IM layer 221 may form the logical link control sublayer and may act as an interface to MAC layer 222. PHY layer 223 may implement the basic networking hardware transmission technologies for WiFi component 220.

In operation, 3GPP-LTE component 210 may maintain a connection with eNB 136 of integrated AP 132 (or with other eNBs). The connection may be an "always on" (or typically on) connection that corresponds to primary cell (PCell) connections for UE 110. WiFi component 220 may maintain "on demand" opportunistic connections with AP 138 of integrated AP 132. The on demand connections may correspond to (SCell) connections for UE 110. Control information relating to the on demand connections may be transmitted, to UE 110, via the PCell. In this manner, the 3GPP-LTE RAN may serve as a control and mobility anchor for WiFi WLANs. The WLAN may effectively be treated as a secondary carrier (layer 2 data pipe) for the primary carrier corresponding to the 3GPP network.

As is further illustrated in FIG. 2, signaling via RRC layers 212 ("Multi-RAT Aggregation/Coordination") may be used to coordinate the integration of the primary and secondary carriers. For example, RRC layer 212 may communicate with NDIS IM layer 221, or with other layers of WiFi 220, to support the integration of the primary and secondary carriers. In integrated AP 132, the multi-RAT aggregation/coordination link may correspond to link 137 (FIG. 1).

UE 110, at any given time, may potentially be able to connect to multiple different available SCells, such as different SCells provided by a single WLAN AP 138 (e.g., potentially corresponding to different WiFi channels) or multiple WLAN APs. Consistent with aspects described herein, UE 110 may provide assistance information to eNB 136, such as via RRC signaling, which eNB 136 may use when making a final decision regarding the SCell to which UE 110 is to connect.

Figure 3:
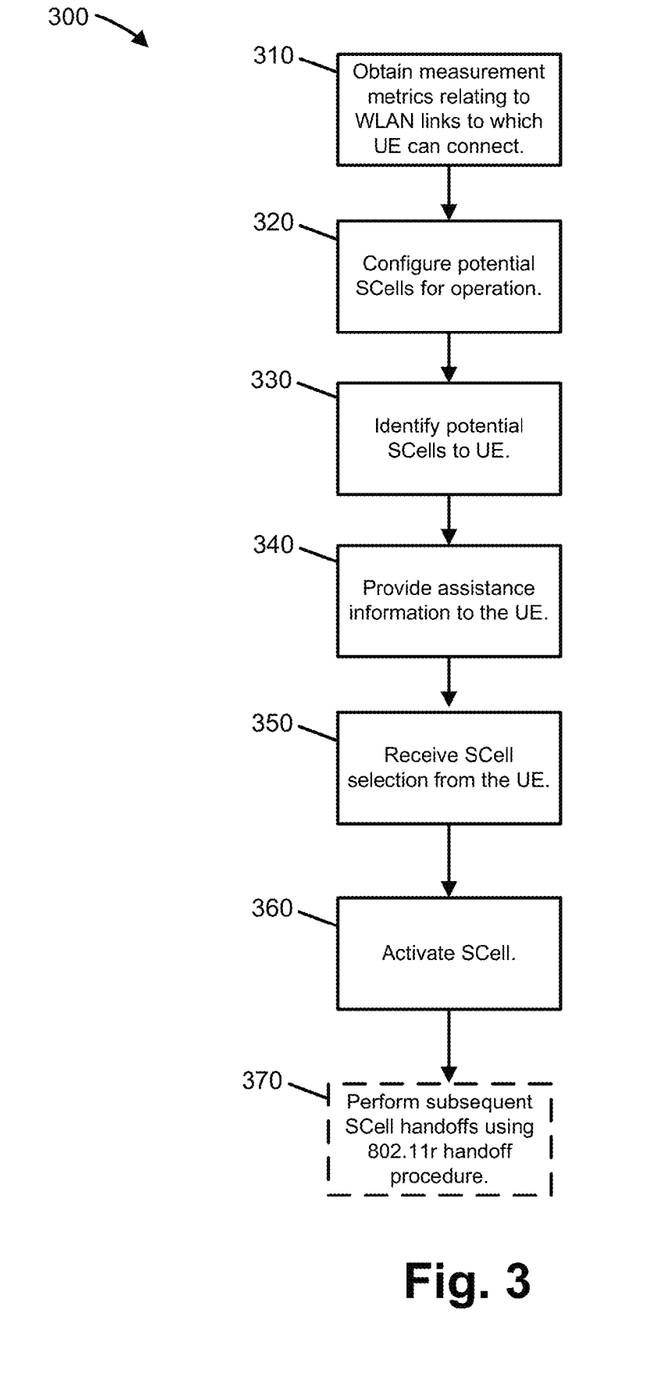
FIGS. 3 and 4 are flow charts illustrating example processes relating to User Equipment (UE)-assisted WLAN secondary cell selection.

FIG. 3 is a flow chart illustrating an example process 300 relating to UE-assisted WLAN SCell selection. Process 300 may be performed by, for example, an eNB that is included within an integrated AP to which a UE is connected (e.g., eNB 136). In one implementation, UE 110 may be in connected mode operation with eNB 136 (i.e., with respect to the WWAN) whenever UE 110 is in the process of using SCells to offload data from the WWAN to a WLAN.

Process 300 may include obtaining measurement metrics relating to WLAN links (e.g., WiFi channels) to which UE 110 can connect (block 310). It may be desirable for eNB 136 to be able to obtain reports, from UE 110, relating to WLAN(s) to which UE 110 can connect. The reports may include measurement metrics relating to the WLANs (e.g., WiFi channels and/or APs). In one implementation, eNB 136 may request, via RRC signaling, a "measurement report" from UE 110. UE 110 may respond to the request by transmitting a measurement report to eNB 136 (via the PCell). In response to a request for a measurement report, UE 110 may periodically or intermittently (e.g., whenever updated measurement metrics can be obtained from a WLAN channel) transmit a measurement report to eNB 136. A non-limiting list of potential measurement metrics, that may be included in the measurement report, include:

- Received Signal Strength Indication (RSSI)/Received Channel Power Indicator (RCPI)/Received Signal-to-Noise Indicator (RSNI);
- Error statistics such as percent missed beacons, Cyclic Redundancy Check (CRC) error statistics, etc.;
- Throughput or other quality of service estimates;
- Access Delay;
- Interference statistics; and
- Measurement cycle, such as the cycle at which the RRC may transmit probe packets for QoS estimation.

Process 300 may further include configuring potential SCells for operation (block 320). For example, based on the measurement report, eNB 136 may determine a desired number of potential SCells to which UE 110 may connect. The SCells may be determined based on the measurement report. The eNB may transmit, to WLAN AP 138, configuration information relating to the potential SCells. For example, via link 137, eNB 136 may transmit an identifier associated with UE 110, such as a Media Access Control (MAC) identifier associated with UE 110. In some implementations, the configuration information may include other information, such as WLAN security keys. In general, the configuration information may be used to allow UE 110 to attach and/or authenticate with WLAN AP 138.

Process 300 may further include identifying the potential SCells to UE 110 (block 330). In one implementation, eNB 136 may transmit, via RRC signaling, an indication of the potential SCells to UE 110. For example, a RRC Connection Reconfiguration message may be transmitted to UE 110 and may include an identification of the SCells (e.g., a Basic Service Set Identification (BSSID)) and/or security keys that UE 110 may use to authenticate with the SCells and/or encrypt data transmitted over the SCells.

Process 300 may further include providing assistance information to UE 110 (block 340). The assistance information may include policies that relate to SCell selection by UE 110. For example, the assistance information may include a prioritized list of WLAN APs. Alternatively or additionally, the assistance information may include minimum signal quality thresholds that should be received from WLAN APs. The assistance information may be provided, over the PCell, via dedicated or broadcast signaling.

Based on the potential SCells that were provided to UE 110 and based on the assistance information, UE 110 may select an SCell and transmit an indication of the selection to eNB 136. Process 300 may further include receiving the SCell selection from the UE (block 350). The indication of the SCell selection may be transmitted from UE 110 to eNB 136 via, for example, an information element in a RRC Connection Reconfiguration Complete message that is transmitted in response to a RRC Connection Reconfiguration message that was previously received by UE 110. Alternatively or additionally, another RRC message, such as a "UE Assistance Information" message may be used to indicate the selected SCell.

When UE 110 initially connects with a WLAN AP, associated with an SCell, UE 110 may not use the SCell for bearer traffic. At this point, the SCell may be referred to as "not activated." eNB 136 may activate the SCell by communicating an indication of activation to UE 110 (block 360). The activation may be performed using, for example, a MAC control element. Once activated, the SCell may be used for data offload from the WWAN. The indication of activation may operate to inform UE 110 of a particular SCell to select. In some implementations, the indication of activation may identify the SCell to select and the identified SCell may or may not be the same as the SCell that was selected by UE 110. In this case, eNB 136 may use the selection from UE 110 as a suggestion that may or may not be followed.

In some implementations, subsequent SCell selection may occur via a WLAN-based handoff mechanism, such as one defined in IEEE 802.11r (block 370). Once a new SCell is selected via the 802.11r mechanism, UE 110 may inform eNB of the selected SCell, such as via the RRC UE Assistance Information message.

Figure 4:
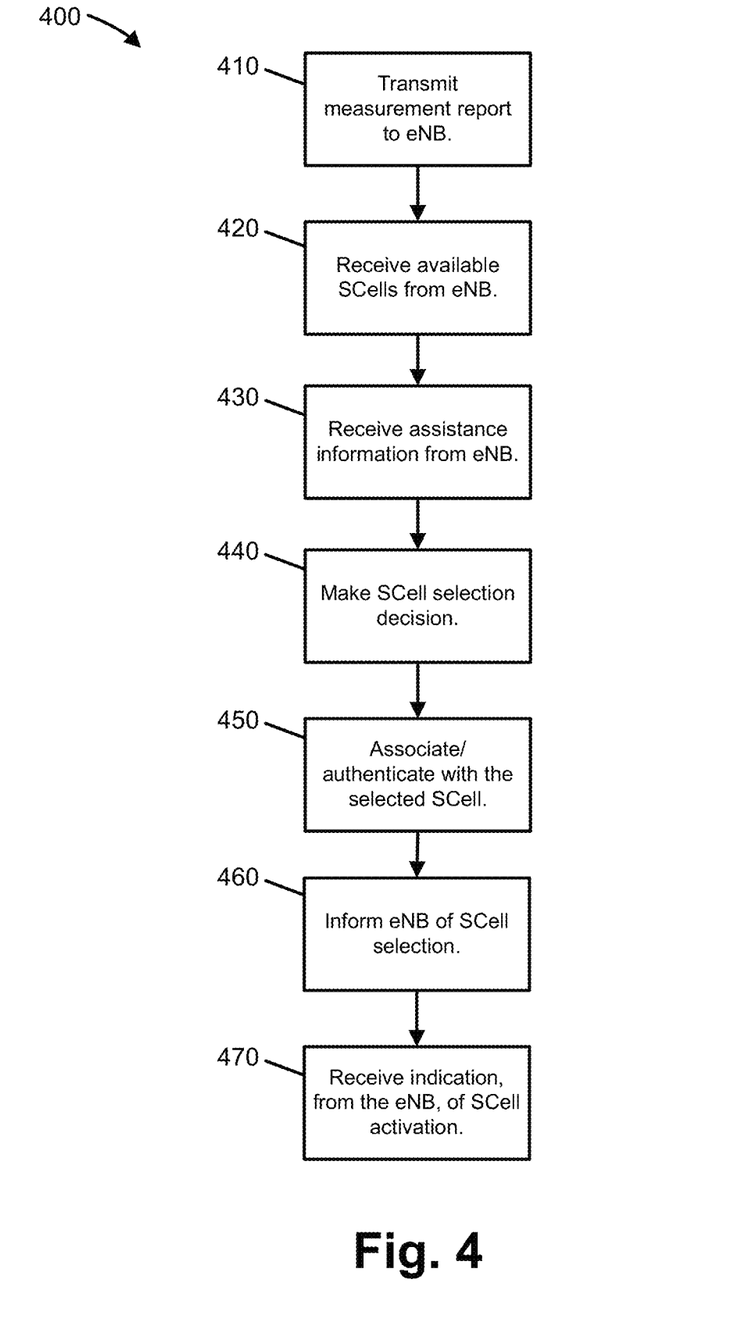

FIG. 4 is a flow chart illustrating an example process 400 relating to UE-assisted WLAN SCell selection. Process 400 may be performed by, for example, UE 110.

Process 400 may include transmitting a measurement report to the eNB (block 410). As previously mentioned, the measurement report may include one or more metrics, measured by UE 110, and that relate to WLAN APs that are within range of UE 110 (e.g., signal strength values, latency/delay values, etc.). The measurement report may be transmitted in response to a request from eNB 136, such as a request received via RRC signaling over the PCell.

Process 400 may further include receiving an indication of available SCells from the eNB (block 420). As mentioned above, in one implementation, eNB 136 may transmit, via RRC signaling and via the PCell, potential SCells to UE 110. For example, a RRC Connection Reconfiguration message may be received by UE 110, and may include an identification of the SCells and/or security keys that UE 110 may use to authenticate with the SCells and/or encrypt data transmitted over the SCells.

Process 400 may further include receiving assistance information from the eNB (block 430). The assistance information may be provided, over the PCell, using dedicated or broadcast signaling. The assistance information may include policies or other information used to guide the selection of an SCell by UE 100. As previously mentioned, assistance information may include, for example, a prioritized list of WLAN APs or channels, minimum signal quality thresholds, or other information.

Process 400 may further include selecting an SCell to which UE 110 is to connect (block 440). UE 100 may make the selection based on the SCells that were provided to UE 110 (in block 420), the assistance information provided to UE 110 (in block 430), based on measurements relating to the potential SCells, and/or based on other information specific to UE 110 (e.g., a type of application requesting network resources, a location or speed of UE 110, etc.). For example, UE 110 may select an AP and/or channel for an SCell based on the SCell being indicated, from eNB 136, as an available SCell (block 420) and based on the SCell satisfying a minimum signal quality threshold that was indicated in the assistance information.

Process 400 may include associating and authenticating with the selected SCell (block 450). The associating and authentication may include using the security keys that were previously provided, by eNB 136, to UE 110. For example, UE 110 may connect to a particular WiFi channel (corresponding to the selected SCell) using the MAC identifier of UE 110 and the security keys. The UE may further inform eNB 136 of the selection of the SCell (block 460). As previously mentioned, the indication of the SCell selection may be transmitted from UE 110 to eNB 136 over the PCell and through RRC signaling, such as using an information element in a RRC Connection Reconfiguration Complete message or as a "UE Assistance Information" message.

The UE may receive an indication, from the eNB, of activation of the selected SCell (block 470). For example, eNB 136 may acknowledge the SCell selection (from block 460) and indicate that the SCell can be activated. eNB 136 may thus confirm (or potentially deny) the SCell selection by the UE. The indication may be performed via a MAC Control Element or via RRC signaling. The activated SCell may be used to offload data from the WWAN to the WLAN.

Figure 5:
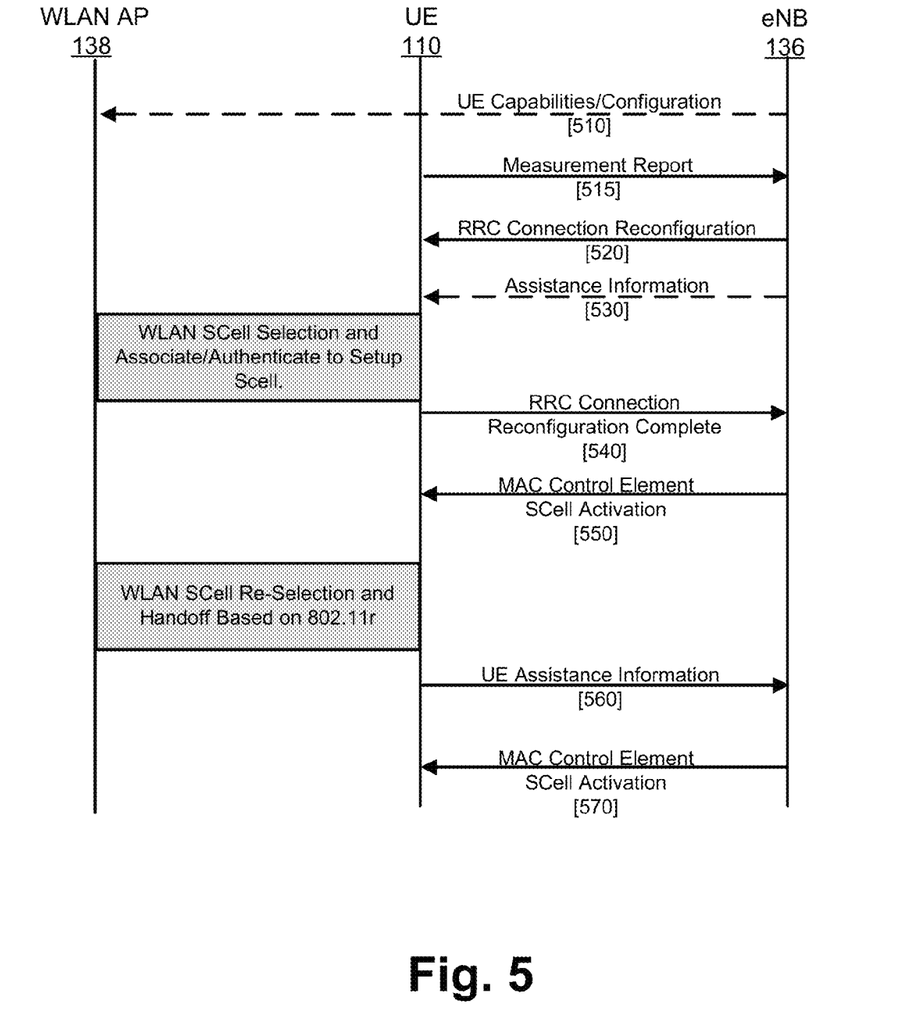
FIG. 5 is a diagram illustrating an example signal flow relating to UE-assisted WLAN secondary cell selection.

FIG. 5 is a diagram illustrating an example signal flow relating to UE-assisted WLAN SCell selection. The signaling shown in FIG. 5 may be performed between WLAN AP 138, UE 110, and eNB 136. WLAN AP 138 and eNB 136 may correspond to the co-located WLAN AP and eNB that are included within integrated AP 132.

As illustrated in FIG. 5, eNB 136 may transmit capability and/or configuration information, relating to UE 110, to WLAN AP 138 (at 510, "UE Capabilities/Configuration"). In one implementation, the information may be exchanged over a proprietary connection, such as link 137. The exchanged information may include WLAN keys and a MAC identifier associated with UE 110. The MAC identifier of UE 110, and potentially other information associated with the WLAN capabilities of UE 110, may have been previously obtained by eNB 136, such as via RRC signaling exchanged between eNB 136 and UE 110, over the PCell.

UE 110 may also transmit a measurement report to eNB 136 (at 515, "Measurement Report"). As previously mentioned, the measurement report may include one or more metrics, measured by UE 110, and that relate to WLAN channels that are within range of UE 110 (e.g., signal strength values, latency/delay values, etc.). The measurement report may be used by eNB 136 to manage the potential SCells.

An RRC Connection Reconfiguration message may be transmitted from eNB 136 to UE 110 (at 520, "RRC Connection Reconfiguration"). The RRC Connection Reconfiguration message may contain information elements that include identifiers of WLAN APs that UE 110 may potentially use (e.g., BSSID) and security keys associated with the SCells. In some implementations, the RRC Connection Reconfiguration message may include other information, such as a v-MAC (virtual MAC) identifier of a default bearer (and/or the signaling bearer), and/or other WLAN configuration parameters.

Assistance information may also be transmitted to UE 110 (at 530, "Assistance Information"). As previously mentioned, the assistance information may be provided using dedicated or broadcast signaling. The assistance information may include policies or other information used to guide the selection of an SCell by UE 110. As previously mentioned, assistance information may include, for example, a prioritized list of WLAN APs or channels, minimum signal quality thresholds, or other information.

In response to the RRC Connection Reconfiguration message, UE 110 may select an SCell and associate/authenticate with the SCell ("WLAN SCell Selection and Associate/Authenticate to Setup SCell"). At this time, the SCell may be setup but UE 110 may not begin to actively use the SCell until confirmation is received from eNB 136 (i.e., the SCell is setup but not active). A message may be transmitted from UE 110 to eNB 136 to indicate when UE 110 has associated with WLAN AP 138 (at 540, "RRC Connection Reconfiguration Complete"). The RRC Connection Reconfiguration Complete message may include information elements that identify the selected SCell. The eNB may acknowledge the SCell selection and indicate that the SCell can be activated. The activation may be performed via a MAC Control Element (at 550, "MAC Control Element, SCell Activation"). Alternatively, RRC signaling may be used to perform the activation.

At this point, in some implementations, subsequent SCell selections may occur via WLAN based handoff mechanisms as defined in IEEE 802.11r ("WLAN SCell Re-Selection and Handoff Based on 802.11r"). UE assistance information may be used to inform eNB 136 of subsequent SCell selections (at 560, "UE Assistance Information"). The UE Assistance Information message may be an RRC layer message and may include an identifier of the selected SCell. The eNB may acknowledge the SCell selection and indicate that the SCell can be activated (at 570, "MAC Control Element, SCell Activation").

In the discussion above with respect to FIG. 5, eNB 136 may communicate WLAN AP parameters (e.g. BSSID) using the information elements in the RRC Connection Reconfiguration message. Alternatively, RAN assistance information (e.g., based on the 3GPP Release 12 framework for WLAN radio interworking) may be used to communicate the WLAN AP parameters. Once UE 110 associates with a WLAN SCell, eNB 136 may add the WLAN SCell based on an exchange of the an RRC Connection Reconfiguration message. In this implementation, the measurement report may not be needed.

When concurrently connected to a PCell and one or more SCells, UE 110 may establish bearer channels to transmit data. In particular, UE 110 may offload data that would normally be transmitted over the LTE air interface (i.e., the WWAN) to the WLAN. Whether data should be transmitted via the WWAN, the WLAN, or both, is referred to herein as "traffic steering" or as a "traffic steering decision" herein. Traffic steering may thus refer to the dynamic determination of whether data should be wirelessly communicated using bearers implemented over the WWAN (e.g., the LTE air interface to an eNB) or offloaded to bearers over WLAN (e.g., via a WiFi access point). In some implementations, user data may be split and a traffic stream concurrently transmitted over the WWAN and WLAN.

Figure 6:
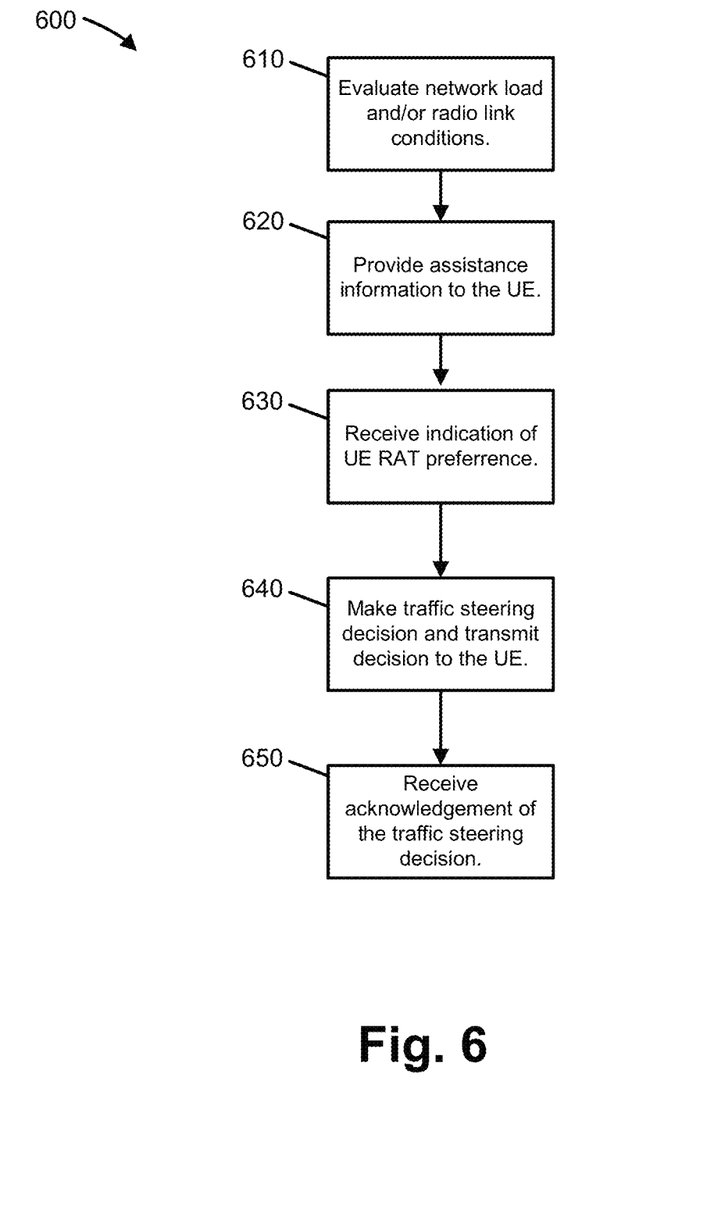
FIG. 6 is a flow chart illustrating an example process relating to UE-assisted traffic steering.

FIG. 6 is a flow chart illustrating an example process 600 relating to UE-assisted traffic steering. Process 600 may be performed by, for example, an eNB that is included within an integrated AP to which a UE is connected (e.g., eNB 136). In one implementation, UE 110 may be in connected mode operation with eNB 136 (i.e., with respect to the WWAN) whenever traffic is being steered between the WWAN and WLAN.

Process 600 may include obtaining or evaluating network load and/or radio link conditions (block 610). For example, eNB 136 may receive, measure, or otherwise obtain network load and/or radio link conditions for the air interface provided by eNB 136 and/or the air interface provided by WLAN AP 138. In some implementations, the measurement metrics included in a measurement report, received from UE 110, may be used as part of the obtained network load and/or radio link conditions.

Process 600 may further include providing assistance information to UE 110 (block 620). The assistance information may include network policies or preferences that relate to traffic steering. For example, the assistance information may include traffic steering rules, thresholds, or other values. For example, the assistance information may indicate that WLAN links, when available, should be preferentially used to transfer certain types of traffic as long as the throughput and latency of the WLAN links satisfy thresholds.

Process 600 may further include receiving an indication of the RAT that is preferred by the UE (block 630). For example, UE 110 may indicate that, based on the assistance information and based on the current environment of UE 110, that traffic should preferably be steered over a WLAN link. Based on the indication received from UE 110 and potentially based on other information, such as the network and/or radio link decisions, eNB 136 may make a traffic steering decision (block 640). For example, eNB 136 may determine to steer traffic in accordance with the preference of the UE as long as the total number of UEs connected to a particular WLAN AP is below a threshold. In general, the preferred RAT, as received from UE 110, may be used as assistance or guidance information that may be used by eNB 136 to make more effective traffic steering situations relative to traffic steering decisions being made using a completely network centric framework. The eNB may transmit the determined traffic steering decision (e.g., the RAT to use for one or more bearers) to the UE (block 640). In one implementation, the indication of the traffic steering decision may be transmitted to UE 110 using RRC signaling, such as an information element in a RRC Connection Reconfiguration message.

The UE may acknowledge the traffic steering decision transmitted by eNB 136. For example, the acknowledgement may be transmitted via an RRC Connection Reconfiguration Complete message. The eNB may receive the acknowledgement of the traffic steering decision (block 650).

Figure 7:
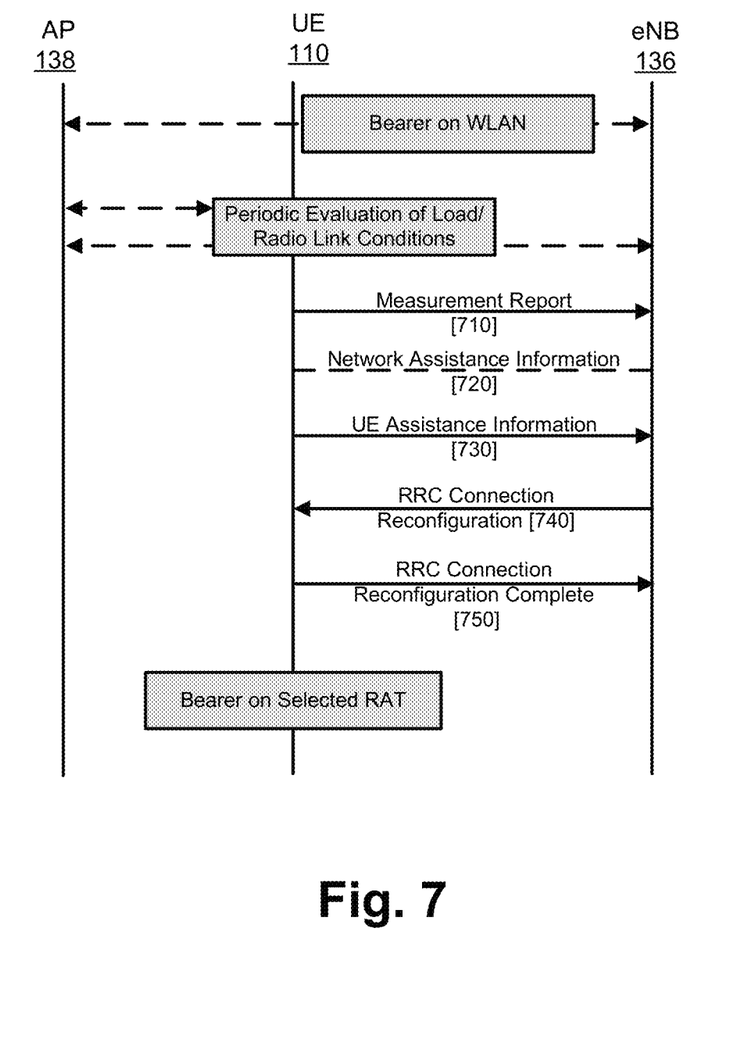
FIG. 7 is a diagram illustrating an example signal flow relating to UE-assisted traffic steering.

FIG. 7 is a diagram illustrating an example signal flow relating to UE-assisted traffic steering. The signaling shown in FIG. 7 may be performed between WLAN AP 138, UE 110, and eNB 136.

As illustrated in FIG. 7, assume a WLAN bearer is established ("Bearer on WLAN"). AP 138 and eNB 136 may exchange, such as via link 137, conditions relating to the WLAN link ("Periodic Evaluation of Load/Radio Link Conditions"). Additionally, UE 110 may transmit a measurement report, as previously discussed, to eNB 136 (at 710, "Measurement Report"). In some implementations, the measurement report may be omitted.

Assistance information may also be exchanged between eNB 136 and UE 110 (at 720, "Network Assistance Information"). The assistance information may be provided using dedicated or broadcast signaling. The assistance information may include network policies or preferences that relate to traffic steering.

At some point, UE 110 may indicate the RAT that is preferred by UE 110 (at 730, "UE Assistance Information"). The UE Assistance Information may be transmitted, to eNB 136, via RRC signaling. The preference indication may be, for example, for a particular RAT (e.g., LTE WWAN or WiFi WLAN) or for splitting of a bearer between multiple RATs. UE 110 may make traffic steering decisions based on the received assistance information and based on UE specific information, such as, for example, a type of application associated with a particular bearer, a type of traffic (e.g., video, audio, etc.) associated with the particular bearer, a location or speed of UE 110, signal quality or throughput associated with the RATs.

The network, such as eNB 136, may evaluate existing radio link conditions across users as well as the loading conditions in the network before making the final decision to steer traffic. The final decision may be indicated via a RRC Connection Reconfiguration message (at 740, "RRC Connection Reconfiguration"). In some implementations, the RRC Connection Reconfiguration message may potentially also indicate to deactivate resources on the unused RAT. UE 110 may acknowledge the message (at 750 "RRC Connection Reconfiguration Complete"). As a result of the traffic steering procedure, a particular RAT may be selected to handle bearer traffic ("Bearer on Selected RAT").

In some implementations, instead of UE 110 indicating the a preference for a particular RAT, UE 110 may indicate a preference in the form of a "weight" for a given RAT. For example, the UE Assistance Information may identify a number of RATs and corresponding weight values for each of the RATs. This weight values may indicate the degree with which the UE prefers a given RAT (e.g., based on platform power, application QoS requirements, operator preferences etc.). The network (e.g., eNB 136) may use this weights to optimize RAT assignment decisions, accounting for UE preferences.

In some implementations, the signaling required for UE initiated traffic steering may be simplified, by using implicit signaling to indicate RAT preference. For example, UE 110 may simply send a "special data packet" (i.e., a packet having a predetermined format) on the selected RAT. This indication may be used by the network to steer downlink traffic towards the requested RAT, if the network chooses to do so. The network may also send a "special acknowledgement data packet" towards the UE to permit the UE to send Uplink traffic by initiating scheduling requests. The "special data packet" on the LTE link can be a MAC Control Element (CE) that is designated as a RAT selection indication packet. Alternatively, UE 110 may select the best RAT for uplink and eNB 136 may sent downlink packets to the last RAT from which an uplink packet was received.

Figure 8:
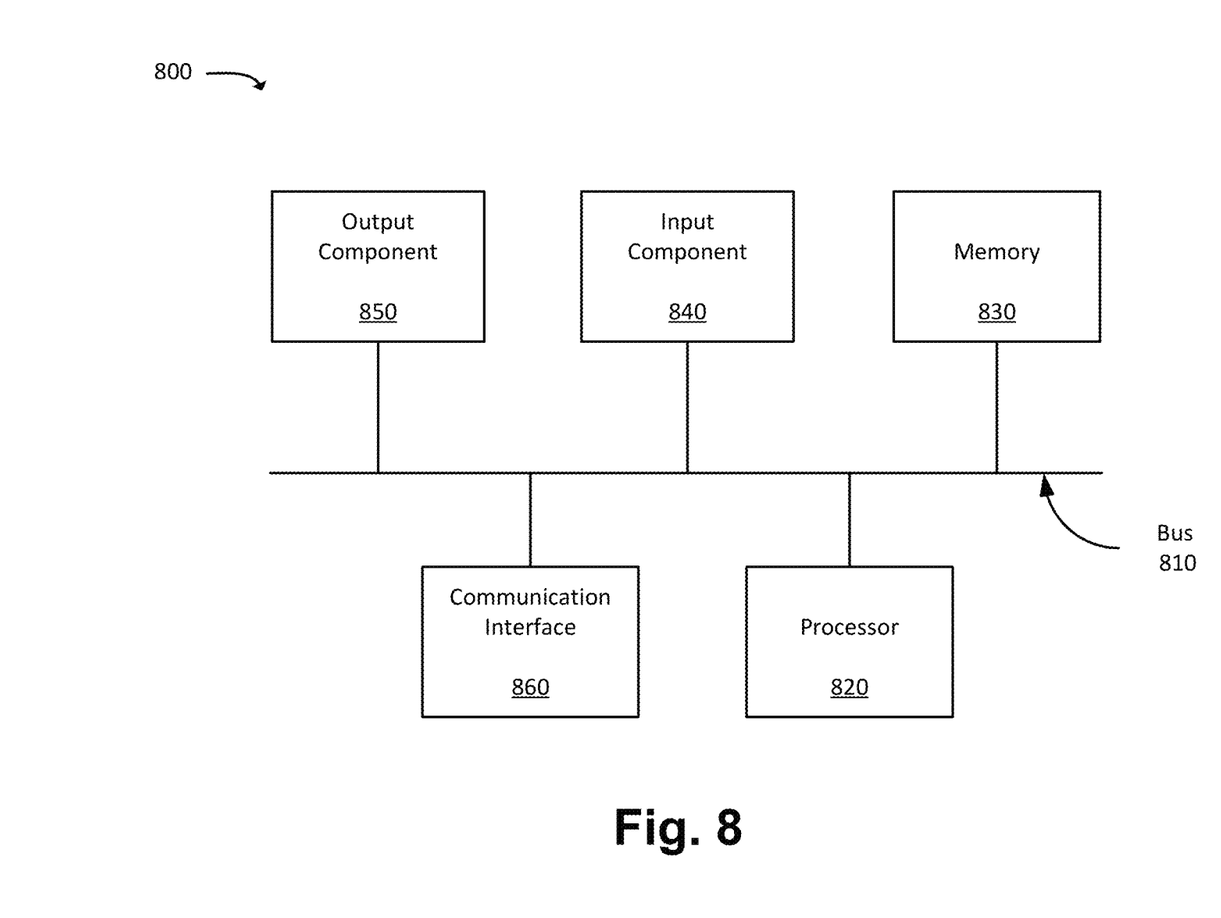
FIG. 8 is a diagram of example components of a device.

FIG. 8 is a diagram of example components of a device 800. Some of the devices illustrated in FIGS. 1 and 2 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include processing circuitry, such as a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of signals have been described with regard to FIGS. 3-7 the order of the signals may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User Equipment (UE) comprising:
   a first component to connect to a Wireless Wide Area Network (WWAN) using licensed frequency spectrum;
   a second component to connect to a Wireless Local Area Network (WLAN) using unlicensed frequency spectrum; and
   processing circuitry to:
   receive, from the WWAN, assistance information including policies that relate to selection of secondary communication cells that are formed over the WLAN, the assistance information including:
   a prioritized list of WLAN access points to which the UE should connect, and minimum signal quality thresholds associated with the WLAN access points;
select a particular secondary communication cell based on the assistance information and based on information specific to the UE;
transmit an indication of the selected particular secondary communication cell, the indication being transmitted via radio resource control (RRC) layer signaling, to an evolved NodeB (eNB) associated with the WWAN;
receive acknowledgement, from the eNB, of the selected particular secondary communication cell; and
route traffic over the secondary communication cell based on the reception of the acknowledgement.

2. The UE of claim 1, wherein the transmitting of the indication of the selected particular secondary cell is performed via a RRC Connection Reconfiguration Complete message or a UE Assistance Information message.

3. The UE of claim 2, wherein the acknowledgement of the selected particular secondary communication cell is received, from the eNB, as a Media Access Control (MAC) Control Element.

4. The UE of claim 1, wherein the processing circuitry is further to:
receive, as information elements associated with a RRC Connection Reconfiguration message, identification of a potential secondary communication cell and security keys associated with the potential secondary communication cell.

5. The UE of claim 1, wherein the processing circuitry is further to:
receive, from the WWAN, additional assistance information including policies that relate to traffic steering between the WWAN and the WLAN; and
indicate, via RRC signaling with the eNB, a traffic steering preference to the eNB.

6. The UE of claim 5, wherein the processing circuitry is further to:
receive, via RRC signaling from the eNB, a decision relating to the traffic steering, and
wherein routing the traffic additionally includes routing the traffic to steer the traffic between the secondary communication cell and a primary communication cell, associated with the WWAN, based on the decision relating to the traffic steering.

7. An integrated access point including:
a wireless local area network (WLAN) access point; and
an evolved NodeB (eNB) that provides an air interface for a Wireless Wide Area Network (WWAN), the eNB being coupled to the WLAN access point via a low latency interface and the eNB including processing circuitry to:
identify one or more secondary cells, associated with the WLAN access point, to which User Equipment (UE) can connect to offload data from the WWAN to the WLAN;
transmit assistance information to the UE, the assistance information including policies that relate to selection of the one or more secondary cells, the assistance information including:
a prioritized list of WLAN access points, including the WLAN access point, to which the UE should connect, and
minimum signal quality thresholds associated with the WLAN access points;
transmit an indication, via radio resource control (RRC) layer signaling, of the one or more secondary cells, to the UE;
receive a selection, from the UE, of one or the one or more secondary cells; and
transmit, to the UE and based on the selection received from the UE, an indication to activate the one of the one or more secondary cells.

8. The integrated access point of claim 7, wherein the indication of the one or more secondary cells is included as information associated with a RRC Connection Reconfiguration Complete message.

9. The integrated access point of claim 8, wherein the selection of the one or more secondary cells is received via RRC layer signaling.

10. The integrated access point of claim 7, wherein the transmission of the indication to activate the one of the one or more secondary cells is performed using a Media Access Control (MAC) Control Element.

11. The integrated access point of claim 7, wherein the processing circuitry is further to:
transmit, to the UE, policies that relate to traffic steering between the WWAN and the WLAN;
receive, via RRC signaling with the UE, a traffic steering preference from the UE; and
transmit, to the UE and based on the received traffic steering preference from the UE, a traffic steering decision.

12. The integrated access point of claim 7, wherein the selection of the one or more secondary cells, from the UE, is based at least partially on the assistance information.

13. User Equipment (UE) comprising:
a first component to connect to a Wireless Wide Area Network (WWAN);
a second component to connect to a Wireless Local Area Network (WLAN); and
processing circuitry to:
receive, from a network device associated with the WWAN, assistance information including policies that relate to traffic steering between the WWAN and the WLAN, the assistance information including:
a prioritized list of WLAN access points to which the UE should connect, and
minimum signal quality thresholds associated with the WLAN access points;
determine, based on the assistance information and based on an environment of the UE, a preference relating to traffic steering between the WWAN and the WLAN;
transmit, via radio resource control (RRC) layer signaling and to the network device, an indication of the determined preference;
receive, via RRC layer signaling from the network device, instructions for performing traffic steering; and
steering traffic between the WWAN and the WLAN based on the received instructions.

14. The UE of claim 13, wherein the instructions for performing the traffic steering are received via a RRC Connection Reconfiguration message.

15. The UE of claim 13, wherein the processing circuitry is further to:
receive, from the WWAN, additional assistance information including policies that relate to selection of secondary cells that are formed over the WLAN;

select a particular secondary cell based on the assistance information and based on information specific to the UE;

transmit an indication of the selected particular secondary cell, the indication being transmitted via radio resource control (RRC) layer signaling, to the network device;

receive acknowledgement, from the network device, of the selected particular secondary cell; and route traffic over the selected secondary cell based on the reception of the acknowledgement.

16. The UE of claim 15, wherein the transmitting of the indication of the selected particular secondary cell is performed via a RRC Connection Reconfiguration Complete message or a UE Assistance Information message.

17. The UE of claim 16, wherein the acknowledgement of the selected particular secondary cell is received, from the network device, as a Media Access Control (MAC) Control Element.

18. The UE of claim 15, wherein the processing circuitry is further to:

receive, as information elements associated with a RRC Connection Reconfiguration message, identification of secondary cells and security keys associated with the secondary cells.

19. An integrated access point including:

a wireless local area network (WLAN) access point; and an evolved NodeB (eNB) that provides an air interface for a Wireless Wide Area Network (WWAN), the eNB being coupled to the WLAN access point via a low latency interface and the eNB including processing circuitry to:

provide, to User Equipment (UE) associated with the eNB, policies that relate to traffic steering between the WWAN and the WLAN, the policies including:

a prioritized list of WLAN access points, including the WLAN access point, to which the UE should connect, and minimum signal quality thresholds associated with the WLAN access points;

receive, from the UE, a traffic steering preference made by the UE; and determine, based on the received traffic steering preference from the UE, a traffic steering decision; and transmit, to the UE, the determined traffic steering decision.

20. The integrated access point of claim 19, wherein the processing circuitry is further to:

receive, from the UE, acknowledgement of the transmitted traffic steering decision.

21. The integrated access point of claim 19, wherein the determined traffic steering decision and the received acknowledgement are communicated via radio resource control (RRC) layer signaling.

22. The integrated access point of claim 19, wherein the determined traffic steering decision is communicated via a RRC Connection Reconfiguration message and the received acknowledgement is communicated via a RRC Connection Reconfiguration Complete message.

23. The integrated access point of claim 19, wherein the processing circuitry is further to:

identify one or more secondary cells, associated with the WLAN access point, to which the UE can connect to offload data from the WWAN to the WLAN;

transmit an indication, via radio resource control (RRC) layer signaling, of the one or more secondary cells, to the UE;

receive a selection, from the UE, of one or the one or more secondary cells; and transmit, to the UE and based on the selection received from the UE, an indication to activate the one of the one or more secondary cells.

24. The integrated access point of claim 23, wherein the indication of the one or more secondary cells is included as information associated with a RRC Connection Reconfiguration Complete message.

25. The integrated access point of claim 24, wherein the selection of the one or more secondary cells is received via RRC layer signaling.

* * * * *